United States Patent [19]

Schenk

[11] 4,202,390
[45] May 13, 1980

[54] SLIP-ON RECEPTACLE

[75] Inventor: Peter Schenk, West Islip, N.Y.

[73] Assignee: Dzus Fastener Co., Inc., West Islip, N.Y.

[21] Appl. No.: 900,142

[22] Filed: Apr. 26, 1978

[51] Int. Cl.² .................................................. F16B 37/04
[52] U.S. Cl. ................................ 151/41.75; 24/221 R; 85/36
[58] Field of Search ................... 151/41.75; 24/221 R, 24/221 A; 85/5 P, 32 K, 36

[56] References Cited

U.S. PATENT DOCUMENTS

| | | | |
|---|---|---|---|
| 2,274,014 | 2/1942 | Tinnerman | 151/41.75 X |
| 2,516,274 | 7/1950 | Tinnerman | 151/41.75 |
| 2,798,277 | 7/1957 | Flora | 24/221 R |
| 3,123,880 | 3/1964 | Barry et al. | 151/41.75 X |
| 3,145,753 | 8/1964 | Kreider | 151/41.75 |
| 3,217,773 | 11/1965 | Munse | 151/41.75 |
| 3,358,729 | 12/1967 | Munse | 151/41.75 |
| 3,755,860 | 9/1973 | Schenk et al. | 24/221 R X |
| 3,802,033 | 4/1974 | Gley | 24/221 R |

Primary Examiner—Rodney H. Bonck
Attorney, Agent, or Firm—Kane, Dalsimer, Kane, Sullivan & Kurucz

[57] ABSTRACT

A slip-on receptacle adapted to be inserted on one of two members to be fastened in alignment with a hole therein and to receive and engage with a stud coupled with the other of the two members so as to fasten the two members together. The receptacle includes a base portion with an opening therein and at least one resilient mounting leg extending from the base into overlying and spaced relationship with respect thereto so as to receive the one member therebetween and mount the receptacle thereon in position with the opening in the base aligned with the opening in the one member. A resilient receptacle leg extends from the base into overlying relationship with respect thereto and is spaced from the base a predetermined distance to permit the one member to be inserted therebetween. The receptacle leg has an opening therein and stud engagement means thereon in position for alignment with the opening in the one member and the base when the receptacle is mounted on the one member to receive the stud coupled with the other member and interengaged therewith to hold the members together. The receptacle leg and each mounting leg are adapted to act independently with the resilient mounting leg accomodating dimensional width variations of the one member and the receptacle leg being a fixed distance from the side of the one member engaged by the base independent of the width diameter of the one member.

11 Claims, 10 Drawing Figures

SLIP-ON RECEPTACLE

BACKGROUND OF THE INVENTION

One common type of fastener employs a stud with a spiral cam slot and a receptacle with a cam follower for engaging the spiral cam slot. A spring is provided to permit the cam follower to follow the cam slot along the surface of the stud and in turn to provide a locking force for two members when the stud is coupled with one of the members and the receptacle is coupled with the other. With fasteners of this type, it is common to couple the stud with the one member to be fastened and to mount the receptacle on the other member to be fastened in some conventional fashion such as by rivets or screws. In this manner when the stud and receptacle are coupled the two members engaged therewith will be held together by coupled fasteners.

Naturally, mounting of the receptacle on the one member in position to receive the stud can be a time consuming and costly procedure. This is particularly true when one is dealing with environments where a large number of fasteners are being employed. Installation time and other cost factors become important. Accordingly, there is always a need for an improved fastener receptacle which can be easily and quickly coupled with one of the members.

Throughout the years various types of slip-on receptacles have been developed which are designed so that the receptacle can be attached to a member to be fastened quickly and efficiently and without the necessity of additional fastener elements. Examples of this appear in U.S. Pat. Nos. 3,802,033; 3,454,071, 2,101,287, 2,230,355; 2,378,257; 3,088,560; 3,123,880; 3,755,860; and French Pat. No. 2,249,572.

The variety of different types of receptacles to accomodate different structural difficulties are readily apparent. A more versatile, improved and inexpensive slip-on receptacle is clearly always in demand and particularly one which solves existing structural expediencies with regard to the types of members being fastened.

SUMMARY OF THE INVENTION

With the above background in mind, it is among the primary objectives of the present invention to provide a one piece slip-on receptacle which can be placed on a member, such as a panel, to be fastened to another member with the receptacle in position to receive a stud and interengage therewith to couple two members together. The receptacle is designed so that it can be slipped into position in one easy motion and contains indexing means and retention means for insuring that the receptacle is properly positioned for reception of the stud. A spring mechanism is provided on the receptacle for permitting engagement and disengagement with the stud in fastening and unfastening operations. The receptacle is designed so that it can be mounted in position without the necessity of additional hardware. It contains an integral spring mechanism to accomodate the necessary fastening action with respect to the stud as well as a separate spring mechanism for mounting of the receptacle on the member being fastened.

A further objective is to provide a receptacle with guide means to assist in guiding the stud into engagement with the stud receiving means also formed on the receptacle so that the stud receiving means can be easily coupled with the stud. Integral spring means on the receptacle accomodates movement of the stud engaging means with the stud and provides the necessary force to hold the two members into tight interengagement. The receptacle also contains stop means thereon for preventing undue rotation of the receptacle as the stud is rotated into engagement therewith.

More specifically, prior art slip-on receptacles have an extremely stiff spring and change the stud grip length as a function of mounting panel thickness as well as retained panel thickness due to cooperation and integral arrangement between the spring holding the receptacle on the member and the receptacle spring for engagement with the stud. The present invention is improved in that the grip length of the fastener is constant from the side of the member being fastened opposite to the side where the receptacle spring leg is located and the location of the receptacle leg for the stud. Also, the spring load for the receptacle leg portion for engagement of the stud can be much lower since it is separately formed from the spring legs engaging and holding the receptacle on the member. The independent spring forces can be adjusted by varying the material thickness or widths of the spring legs.

In the present invention, there is at least one and preferably two resilient mounting legs for gripping the member being fastened with a predetermined load to hold the member between the resilient mounting legs and the base of the receptacle. The receptacle has a general U-shaped configuration with the member on which it is mounted held between the opposing sides. The mounting legs and the receptacle leg form one side and are integrally formed with a rectangularly shaped base portion forming the other side of the receptacle. The closed integral portion connecting the legs with the base forms the closed end of the U-shaped receptacle and engages the edge of the member on which the receptacle is mounted.

The receptacle leg is mounted adjacent and parallel to each resilient mounting leg and when there are two mounting legs, it is spaced between the two legs. It has a free end adjacent and spaced from one side of the member held in the receptacle and forms an integral arcuate U-shaped integral connection with the base. The receptacle leg has a separate spring strength from the mounting legs and is located a fixed distance below the surface of the member on which the receptacle is mounted adjacent to the base and opposite to the location of the receptacle leg.

The present receptacle permits the member or panel fastened to be moved between the mounting legs and the base and bias the mounting legs sufficiently to accomodate various panel thicknesses and hold the receptacle on the panel. However, the distance between the receptacle leg and the surface of the panel opposite to the receptacle leg remains the same and does not change. To facilitate operation of the receptacle, the receptacle leg is generally made slightly less stiff than the two mounting legs and is accomplished by varying dimensions of the respective legs.

When a stud is inserted through the receptacle and engages the tangs in the receptacle legs, the locking tension on the stud is a function of the spring action of the receptacle leg in which the tabs are located. The panel or member holding tension is a function of the mounting legs and the tangs on the receptacle leg. If the spring force is exceeded, the entire receptacle will move upward toward the panel on which the stud is mounted until the receptacle leg bottoms on the adjacent side of the panel. Thus, the panel containing the stud is always clamped to the panel containing the receptacle, but separation can occur if the spring load is exceeded. This forms an acceptable fastener arrangement consistent with preferred designed criteria. There is no looseness between parts at any time.

In summary, a slip-on receptacle is provided which is adapted to be inserted on one of two members to be fastened in alignment with a hole therein and to receive and engage with a stud coupled with the other of the two members so as to fasten the two members together. The receptacle includes a base portion with an opening therein. At least one resilient mounting leg extends from the base into overlying and spaced relationship with respect thereto so as to receive the one member therebetween to mount the receptacle thereon in position with the opening in the base aligned with the opening in the one member. A resilient receptacle leg extends from the base into overlying relationsip with respect thereto and is spaced from the base a predetermined distance to permit the one member to be inserted therebetween. The receptacle leg has an opening therein and stud engagement means thereon in position for alignment with the opening in the one member and the base when the receptacle is mounted on the one member to receive the stud coupled with the other member and interengaged therewith to hold the members together. The receptacle leg and each mounting leg is adapted to act independently with the resilient mounting leg accomodating dimensional width variations of the one member and the receptacle leg being a fixed distance from the side of the one member engaged by the base independent of the width diameter of the one member.

With the above objectives among others in mind, reference is made to the attached drawings.

DETAILED DESCRIPTION

Figure 1:
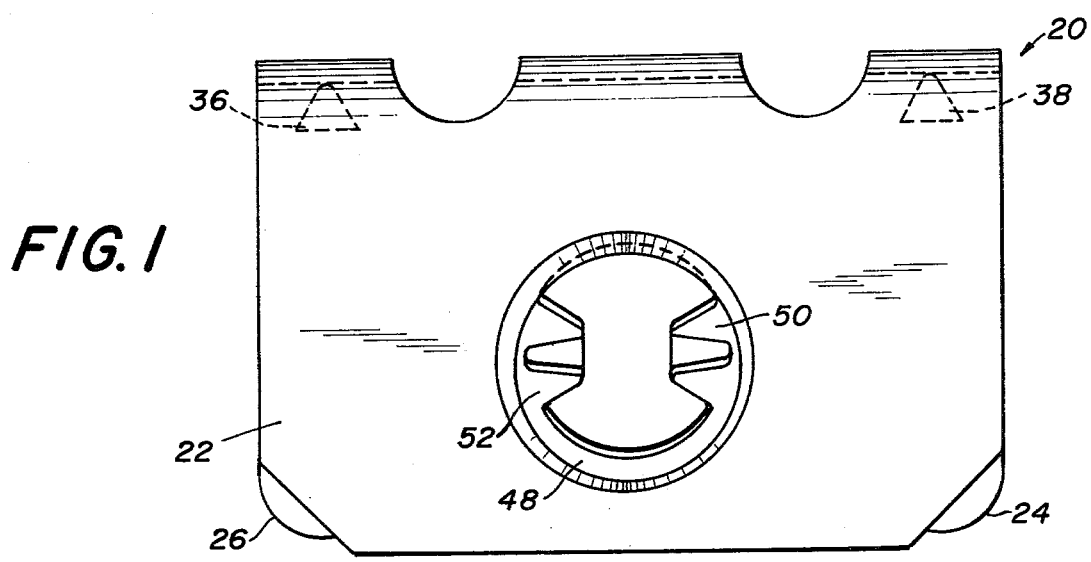
FIG. 1 is a top plan view of the receptacle of the invention.
Figure 2:
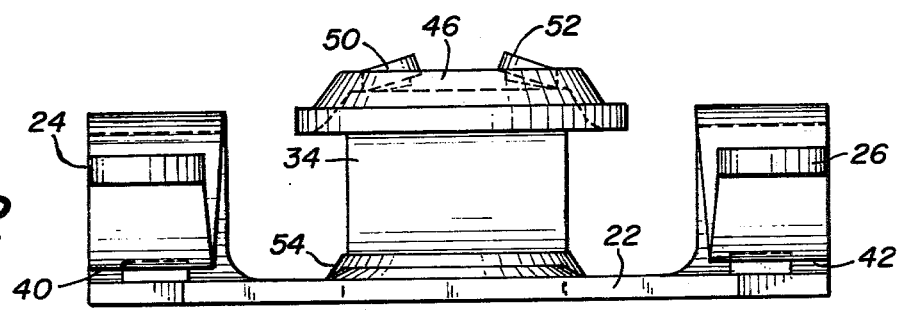
FIG. 2 is a side elevation view thereof.
Figure 3:
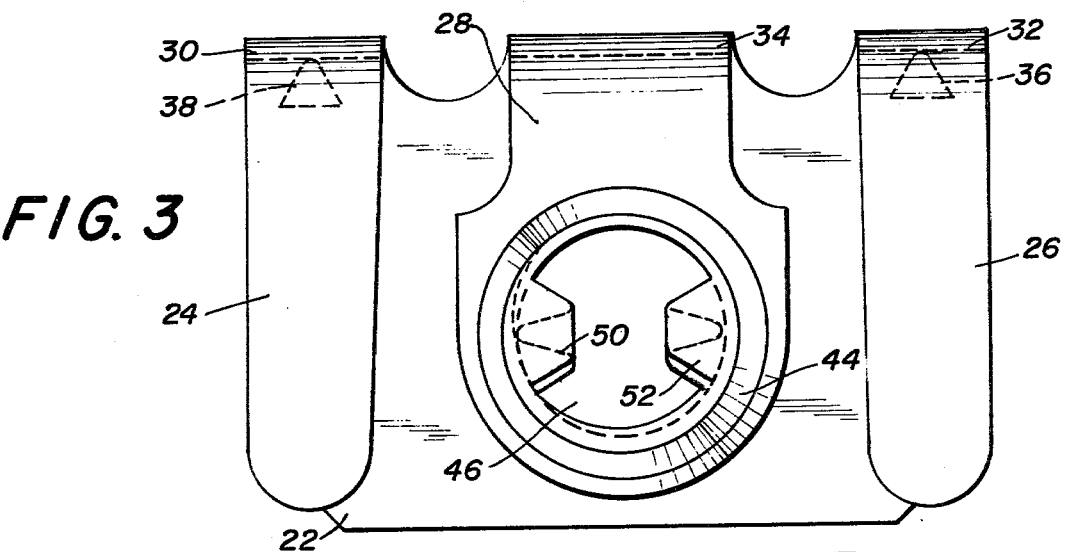
FIG. 3 is a bottom plan view thereof.
Figure 4:
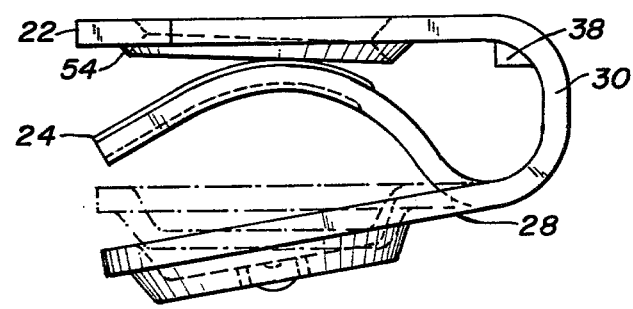
FIG. 4 is an end elevation view thereof.

Receptacle 20 is shown in FIGS. 1-4 independent of interengagement with other members. Receptacle 20 has a general U-shaped configuration and is formed of an integral one piece design. It has a relatively flat rectangular base portion 22 forming one side of the receptacle and an arrangement of three spring legs forming the other side of the receptacle with the arcuate portions interconnecting the spring legs and the base forming the closed end of the U-shaped receptacle 20. There are two spaced mounting legs 24 and 26 and a central receptacle leg 28 located between the mounting legs. The number of mounting legs is a matter of choice. All of the legs are formed of resilient material and are independently formed so that they can be dimensioned independently and have different spring strength factors. Mounting leg 24 is integrally formed with base 22 through arcuate closed end portion 30. Similarly, mounting leg 26 is integrally formed with base 22 through arcuate closed end portion 32. Finally, intermediate receptacle leg 28 is integrally formed with base 22 through arcuate portion 34. The curved portions 30, 32 and 34 form the closed end of the U-shaped receptacle 20.

To facilitate alignment and to form a stop means for the receptacle, a tab 36 is formed on the inner surface of the closed end portion 32 and a similar tab 38 is formed on the inner surface of the closed end portion 30.

Each of the legs 24 and 26 are convoluted as they extend from the integral connection with base 22 until they reach their free ends. The convolutions include a central arcuate inwardly extending projection or apex 40 on leg 24 and a similar projection or apex 42 on leg 26. The projections are adjacent to the inner surface of base 22 and are spaced therefrom a predetermined distance. They move resiliently away from the base 22 when subjected to a force. Legs 24 and 26 are formed of resilient material and their relative resistance to resilient movement depends upon the material used and the width and thickness of the legs. This is a matter of choice depending upon the use and the nature of the members being fastened.

The centrally located receptacle leg 28 terminates at its free end in an enlarged ring 44 which includes a central opening 46. The opening 46 is in alignment with the opening 48 in the base to accomodate insertion of a stud therethrough for interengagement with a pair of opposing inwardly extending tangs 50 and 52. The tangs are positioned on ring 44 at diametrically opposed positions and extend inwardly toward one another for engagement with an appropriate cam slot on the stud to assemble the fastener. Receptacle leg 28 is formed of resilient material and its resilience is again determined by the material used and the width and cross sectional dimensions depending upon the nature of the fastener assembly and the members being fastened. Since receptacle leg 28 is separate from mounting legs 24 and 26, the strength and resilience of these respective members can be different and adjusted accordingly.

A conical flange 54 surrounds opening 48 in base 22 and extends inwardly therefrom toward receptacle leg 28. This flange surrounds opening 48 and provides a guiding surface for introduction of a stud and also serves to index the receptacle 20 with respect to a member to be fastened. The amount of extension of flange 54 is predetermined so that it does not interfere with mounting of the receptacle on the member being fastened but merely seats in the aperture in the member.

It has been found to be acceptacle to form the one piece receptacle 20 of a tampered spring steel material so that the mounting legs 24 and 26 and the receptacle leg 28 have the necessary resilience to act as spring members and facilitate slipping the receptacle onto a member to be fastened and coupling of the receptacle with a stud. Naturally it is not necessary for the entire receptacle 20 to be of resilient material as long as the legs are of such a material. Alternatively, other well known materials can be substituted for spring steel such as a resilient plastic.

Figure 5:
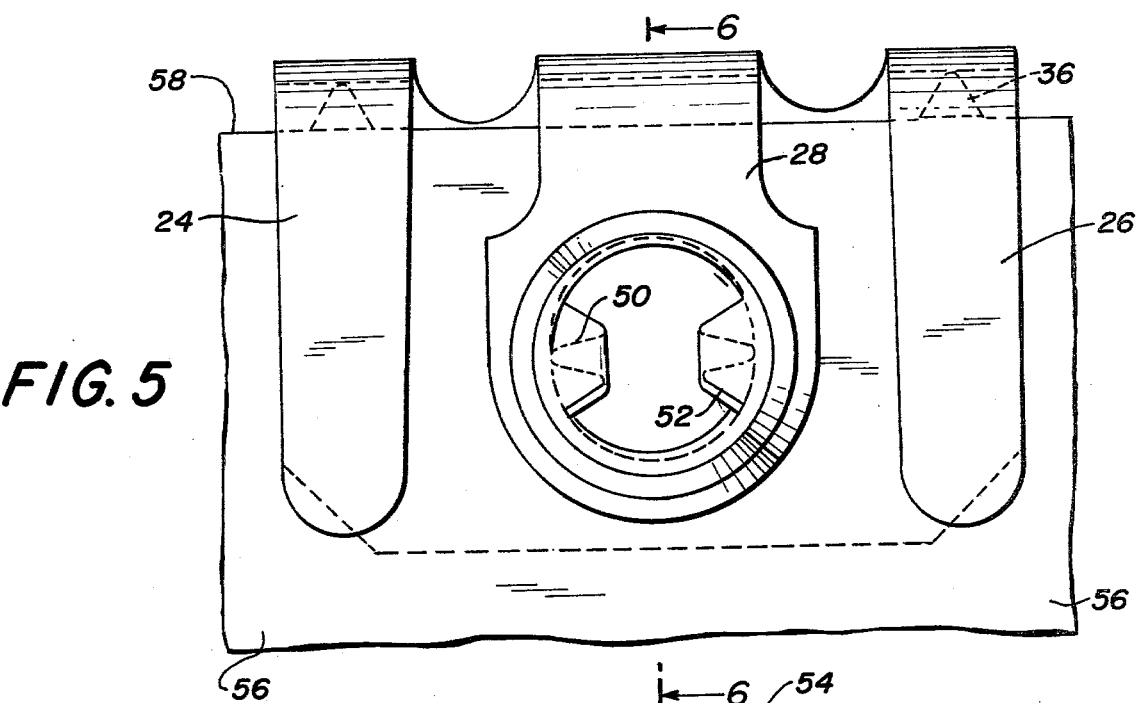
FIG. 5 is a bottom plan view thereof with the receptacle mounted on a fragmentary portion of a panel.
Figure 6:
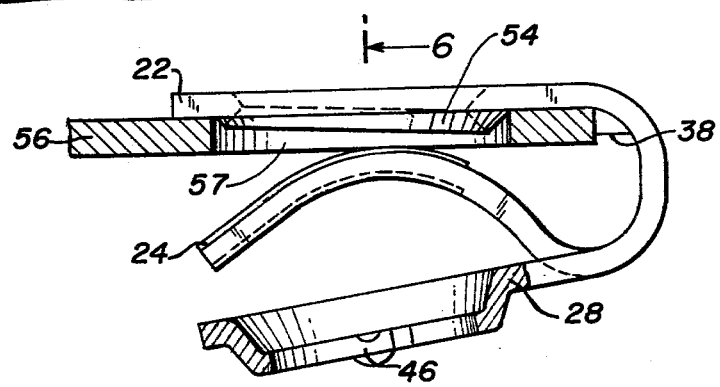
FIG. 6 is a sectional end elevation view thereof taken along the plane of line 6—6 of FIG. 5.
Figure 7:
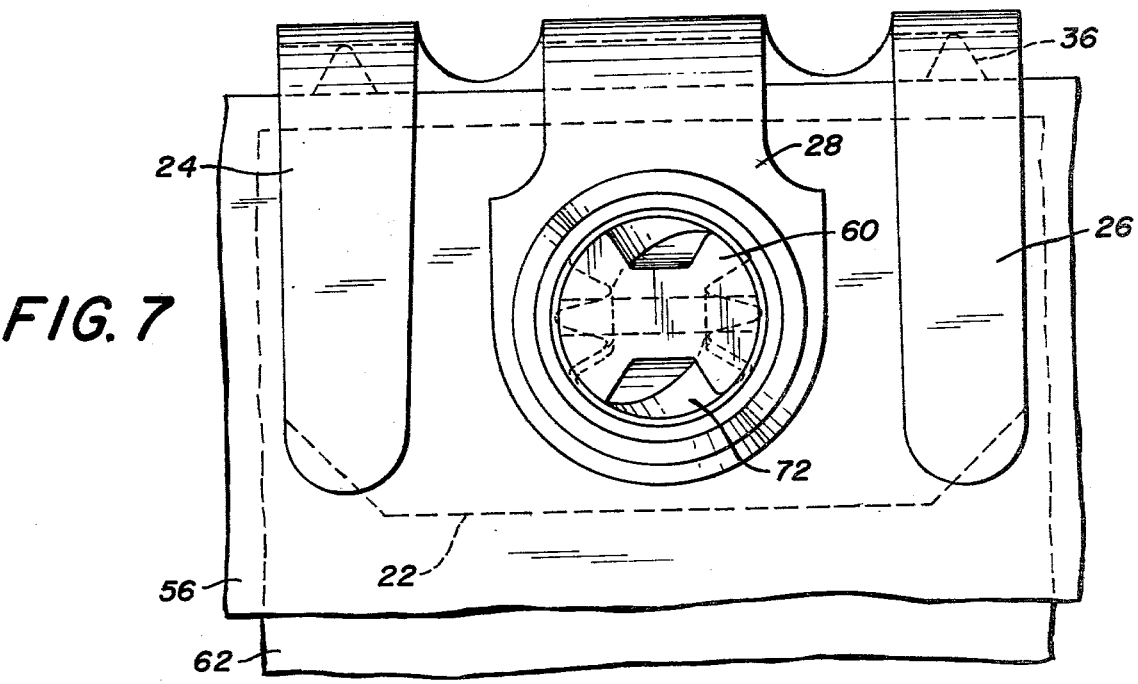
FIG. 7 is a bottom plan view thereof with the receptacle mounted on one panel and a stud mounted on a fragmentary portion of a second panel and the stud coupled with the receptacle holding the two panels together.

FIGS. 5–7 depict receptacle 20 mounted on a panel 56 serving as one of the two members being fastened. The panel 56 has an aperture 57 which is adapted to be aligned with opening 48 in the receptacle base and opening 46 in the receptacle leg. Receptacle 20 is slipped into panel 56 with the leading edge 58 of the panel being inserted between the underside of legs 24, 26, and 28 and the adjacent surface of base 22. The receptacle 20 is properly indexed with respect to the panel 56 in a quick and efficient manner by means of conical flange 54 which seats within aperture 57 without extending entirely through the aperture as depicted in FIG. 6. This automatically aligns all of the openings. Alignment is also assisted by the adjacent relationship between edge 58 and tabs 36 and 38 at the inner closed ends of legs 24 and 26 respectively. As the panel 56 is inserted, engagement with projections 40 and 42 on legs 24 and 26 respectively biases the legs away from base 22. The tendency of these legs to return to the relaxed condition forms a retention force for the receptacle on the panel 56. The receptacle is then in position to receive a stud for coupling of the fastener.

Figure 8:
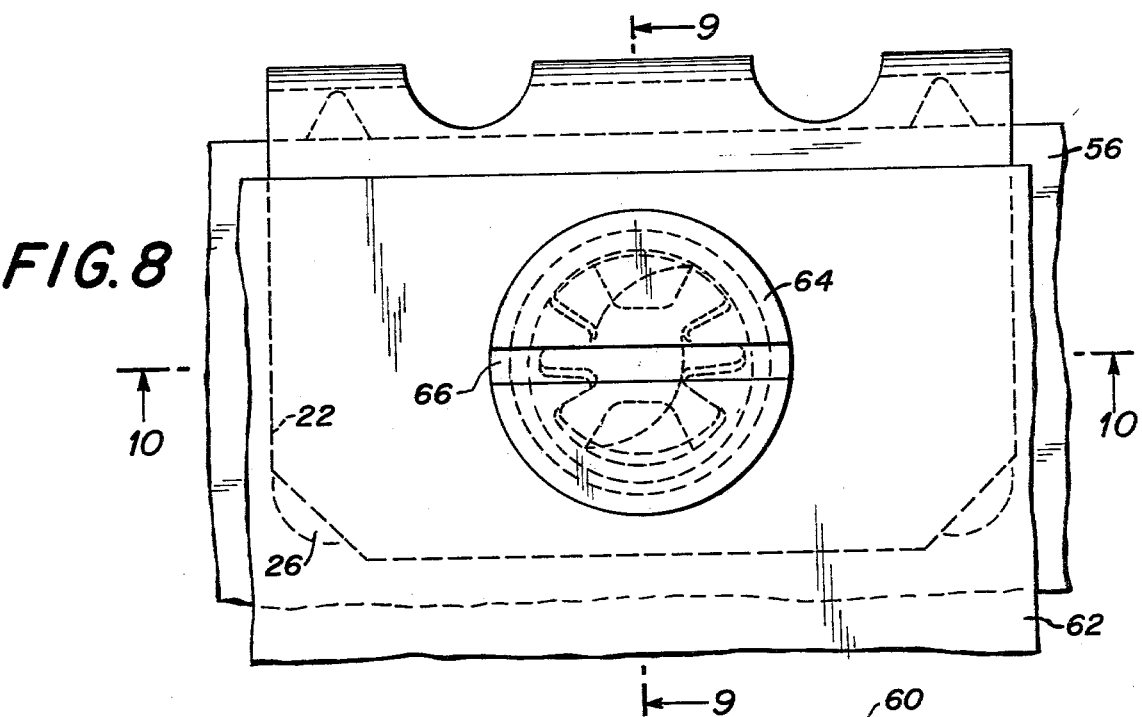
FIG. 8 is a top plan view thereof.
Figure 9:
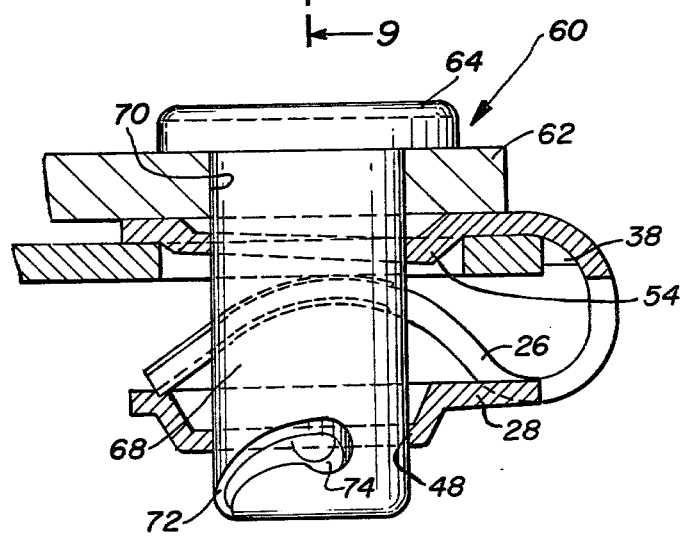
FIG. 9 is a sectional end elevation view thereof taken along the plane of line 9—9 of FIG. 8.
Figure 10:
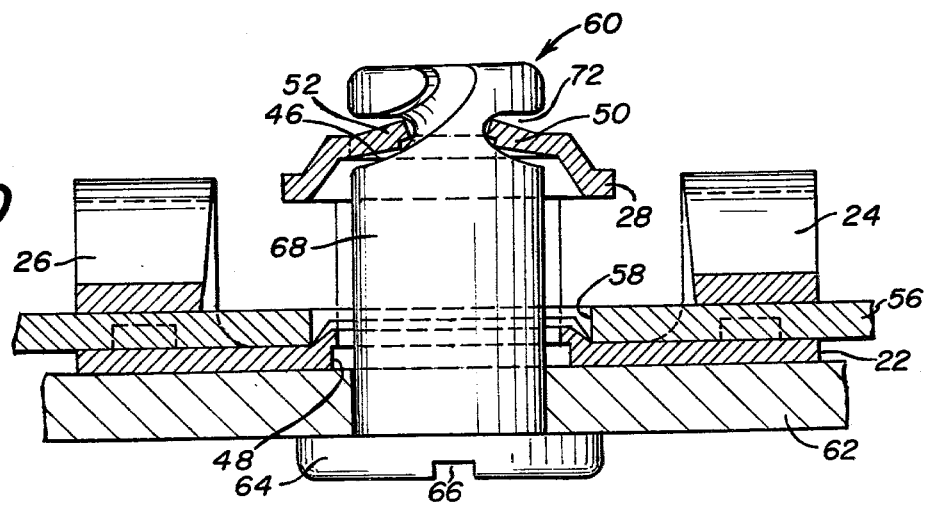
FIG. 10 is a sectional side elevation view thereof taken along the plane of line 10—10 of FIG. 8.

FIGS. 8–10 show the interengaged relationship between the receptacle 20 mounted on panel 56 with a stud 60 coupled with a second member to be fastened in the form of a panel 62. The stud is of a conventional type containing an enlarged head 64 with a central slot 66 for engagement by a tool to rotate the stud between the fastened and unfastened positions. A shank portion 68 of narrower diameter than the head 64 is passed through a hole 70 in panel 64 until the undersurface of head 64 engages with the outer surface of panel 62.

Adjacent to the end of shank 68 distal from head 64 is a spiral cam slot 72. The spiral cam slot terminates in a locking detent 74 at its inner end. The stud shank 68 is of lesser diameter than the aligned openings 48, 57 and 46 of the receptacle and panel 56 so that the shank is passed through these openings and is brought into alignment with tangs 50 and 52. In this position panel 62 is captured between the upper surface of base 22 and the undersurface of head 64 of stud 60. In turn, panel 56 is captured between the undersurface of base 22 and the inner projecting portions of convoluted legs 24 and 26, particularly projections 40 and 42. As shown, receptacle leg 28 is free from engagement with the panels and is in position for movement in locking action with stud 60. This is accomplished by rotation of the stud in the locking direction which causes tangs 50 and 52 to follow the spiral cam slot 72 until they seat in the locking detent 74. The axial movement of the tangs is accomodated by the spring action of resilient leg 28. In this manner, panel 62 and 56 are retained in tight interengagement.

Receptacle 20 is prevented from over rotation by engagement between tabs 36 and 38 and edge 58 of panel 56. This is true in either direction of rotation and forms adequate stop means so that proper relative rotation can occur between the stud and receptacle. Alternatively, in the absence of tabs 38 and 36, the closed end portions of legs 24 and 26, that is arcuate closed portions 30 and 32, will form stop means with their inner surfaces in engagement with edge 58 of panel 56.

Unfastening of the assembly can be accomplished in the same quick and efficient manner. A tool is inserted in slot 66 and stud 60 is rotated in the opposite direction thus causing tangs 50 and 52 to travel out of detent 74 and along cam slot 72 until the stud is free of the tangs. The stud and panel 62 can then be removed from the receptacle and panel 56.

It will be noted that since receptacle leg 28 does not engage with panel 56 when the receptacle is mounted thereon, the grip length of the fastener is constant, that is the distance from the exposed face of base 52 on panel 56 and the location of tangs 52 and 50 independent of the thickness of the panel 56. Also, it is possible to provide for a lower or greater spring load on leg 28 than legs 24 and 26 to enhance the locking action between the stud and receptacle leg. This is feasible since legs 24 and 26 act independently in retaining the receptacle to panel 56 and leg 28 is only utilized to engage with stud 60. The three legs are interconnected with base 22 but are not interconnected with one another which enables this separate resiliently acting action. Legs 24 and 26 slip beneath panel 56 and grip the panel with a certain load as spring members. They terminate at a point of independent integral formation with base 22 which slips over the top of the panel.

As stated above, receptacle leg 28 containing tangs 50 and 52 extends from the top of base 22 a fixed distance from the top exposed surface of base 22 which is retained when receptacle 20 is slipped unto panel 56. The two mounting legs 24 and 26 are biased to accomodate the various panel thicknesses but the receptacle leg location is not affected since the leg is not shifted. In general practice, it is preferable to make receptacle leg 28 less stiff than mounting legs 24 and 26 to facilitate fastening operation between the stud and receptacle and also gaining the benefit of a tight interengagement between the receptacle and the panel 56. This is accomplished by varying the width and cross section of the respective legs.

When stud 60 is inserted through panel 62, panel 56 and base 22 and engages the tangs 50 and 52, the locking tension on the stud is a function of the receptacle leg 28 acting as a spring member. The panel holding tension is a function of both the mounting legs 24 and 26 and the receptacle leg 28. If this spring force is exceeded, the receptacle leg 28 will move upward until receptacle leg 28 bottoms on the adjacent side of panel 56. Thus, the outer panel 62 is always clamped to the panel 56, but separation can occur if the spring load is exceeded. In this manner, there is no looseness between parts at any time.

Receptacle 20 is a one piece metal or plastic part formed so that it can be slipped on to a metal or plastic member with a hole in it. Naturally the receptacle can be formed of several parts which are interconnected, however the preferred form is a one piece design. Conical flange 54 can be formed by a stamping process and is designed to slip into the hole 57 in the panel 56 so that the receptacle 20 is retained on the panel. An additional flange 54 provides a tapered entry for stud 60. Tangs 50 and 52 are positioned for engagement with the spiral cam slot in the stud and could as an alternative be a solid bar.

When stud 60 engages the tangs 50 and 52 they move in an axial direction with respect to the stud to exert tension on the stud to hold the outer panel 62 to the inner panel 56 and lock the stud in the detent position with the tangs in corresponding detent 74 at the end of the spiral cam slot.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A slip-on receptacle adapted to be inserted on one of two members to be fastened in alignment with a hole therein and to receive and engage with a stud coupled with the other of the two members so as to fasten the two members together comprising:
   a base portion with an opening therein;
   at least one resilient mounting leg extending from the base into overlying and spaced relationship with respect thereto so as to receive the one member therebetween to mount the receptacle thereon in position with the opening in the base aligned with the opening in the one member;
   a resilient receptacle leg extending from the base into overlying relationship with respect thereto and being spaced from the base a predetermined distance to permit the one member to be inserted therebetween;
   the receptacle leg having an opening therein and stud engagement means fixed on said receptacle leg in position for alignment with the opening in the one member and the base when the receptacle is mounted on the one member to receive the stud coupled with the other member and interengaged therewith to hold the members together; and
   the receptacle leg and each mounting leg adapted to act independently with the resilient mounting leg accommodating dimensional width variations of the one member and the receptacle leg and stud engagement means being a fixed distance from the side of the one member engaged by the base independent of the width dimension of the one member to provide for a stud grip length that does not change as a function of the width of the one member.

2. The invention in accordance with claim 1 wherein there are two spaced resilient mounting legs with the receptacle leg located between the mounting legs and all of the legs being substantially parallel to one another.

3. The invention in accordance with claim 2 wherein the receptacle is U-shaped in configuration, the base portion being one side of the U-shaped receptacle and being substantially rectangular in configuration, the two mounting legs and the receptacle leg being integrally formed with the rectangular shaped base with the portion adjoining the base being arcuate in configuration and forming the closed end of the receptacle and the legs extending therefrom to form the other side of the U-shaped receptacle.

4. The invention in accordance with claim 3 wherein the mounting legs have a predetermined width and thickness to provide the desired gripping force against the one member on which the receptacle is mounted and the receptacle leg having a predetermined width and thickness to have an independent spring force to facilitate locking interengagement with the stud.

5. The invention in accordance with claim 4 wherein the two spaced mounting legs are convoluted in configuration curving arcuately toward the one member from the portion connecting to the base to an apex for direct engagement with the one member and then curving arcuately in the opposite direction to a free end.

6. The invention in accordance with claim 3 wherein the receptacle leg extends from the closed arcuate end of the receptacle and terminates in an annular ring the opening in the ring forming the opening in the receptacle leg and the stud engaging means positioned with respect to the opening in the ring to engage with the stud.

7. The invention in accordance with claim 6 wherein the stud engaging means has a pair of tangs diametrically opposed on the ring and extending inwardly toward one another for engagement with a spiral cam slot formed in the end of the stud.

8. The invention in accordance with claim 1 wherein stop means is provided on the receptacle body to limit rotation of the receptacle with respect to the members being fastened.

9. The invention in accordance with claim 8 wherein the stop means includes at least one tab on the inner surface of the portion of the receptacle in alignment with the edge of the one member to be fastened when the member is inserted between the base and the legs of the receptacle, the tabs engaging with the edge of the one member and preventing relative rotation between the receptacle and the one member.

10. The invention in accordance with claim 1 wherein indexing and guide means is in surrounding relationship with the opening through the base portion to facilitate positioning of the receptacle on the one member and to guide the stud through the opening in the base portion.

11. The invention in accordance with claim 10 wherein the indexing and guide means is a conically shaped flange surrounding the opening in the base portion and extending toward the receptacle leg, the flange being dimensioned so that it can slip into the opening in the one member for positioning of the receptacle with respect to the one member and to guide the stud through the base portion and through the opening in the one member into alignment with the receptacle leg for coupling therewith.

* * * * *